United States Patent

[11] 3,561,463

| [72] | Inventor | Basil B. Beeken<br>New Haven, Conn. |
|---|---|---|
| [21] | Appl. No. | 759,440 |
| [22] | Filed | Sept. 12, 1968 |
| [45] | Patented | Feb. 9, 1971 |
| [73] | Assignee | Pitney-Bowes, Inc.<br>Stamford, Conn.<br>a corporation of Delaware |

[54] CONTROL DEVICE
1 Claim, 2 Drawing Figs.

[52] U.S. Cl. ............................................. 137/81.5
[51] Int. Cl. ............................................. F15c 1/18
[50] Field of Search ............................................. 137/81.5

[56] References Cited
UNITED STATES PATENTS
1,549,196  8/1925  Hall ............................. 137/81.5X

| 1,628,723 | 5/1927 | Hall | 137/81.5X |
| 3,144,037 | 8/1964 | Cargill et al. | 137/81.5 |
| 3,169,548 | 2/1965 | McIntosh | 251/368X |
| 3,398,758 | 8/1968 | Unfried | 137/81.5 |
| 3,413,996 | 12/1968 | Fine | 137/81.5 |
| 3,456,668 | 7/1969 | Wheeler, Jr. | 137/81.5 |

Primary Examiner—Samuel Scott
Attorneys—William D. Soltow, Jr., Albert W. Scribner and Martin D. Wittstein ABSTRACT: A sonically sensitive fluid amplifier that has a thin plastic film or membrane stretched across the control line thereof whereby sonic control signals can effectively pass through said control line but foreign particles and contaminates are blocked from entry through said line into the fluid amplifier.

PATENTED FEB 9 1971

3,561,463

INVENTOR.
BASIL B. BEEKEN
BY
Albert W. Scribner
ATTORNEY 3,561,463

CONTROL DEVICE

BRIEF SUMMARY

This invention relates to an improved fluid operated acoustically sensitive receiver or control device.

Several fluid-type acoustically sensitive receivers have been proposed for use in conjunction with other fluidic elements for sonically detecting the presence of sheets, cards, and other objects. These receivers while adequate in many instances are limited in their application to environments in which the possibility of contaminants entering the fluid system through the sound receiving portion of the device is remote. The instant invention contemplates the provision of an acoustical sensing system that is capable of operating in most any environment in which considerable foreign and/or contaminating substances or conditions exist.

The primary object of the instant invention is to provide a fluid-operated acoustically sensitive receiver or control device in which contaminants will be prevented from entering the sound wave receiving opening of the sensing device while the effective transmittal of an acoustical signal through said opening will still be possible.

Another object of the instant invention is to provide a novel sealed control line for an acoustically sensitive control device.

Another object of the invention is to provide a thin plastic membrane in the control line of an acoustically sensitive fluid control device whereby sonic signals may be transmitted through said line but foreign particles are physically blocked from entry into the device through said control line.

Other objects will become apparent as the disclosure progresses.

IN THE DRAWINGS

Figure 1:
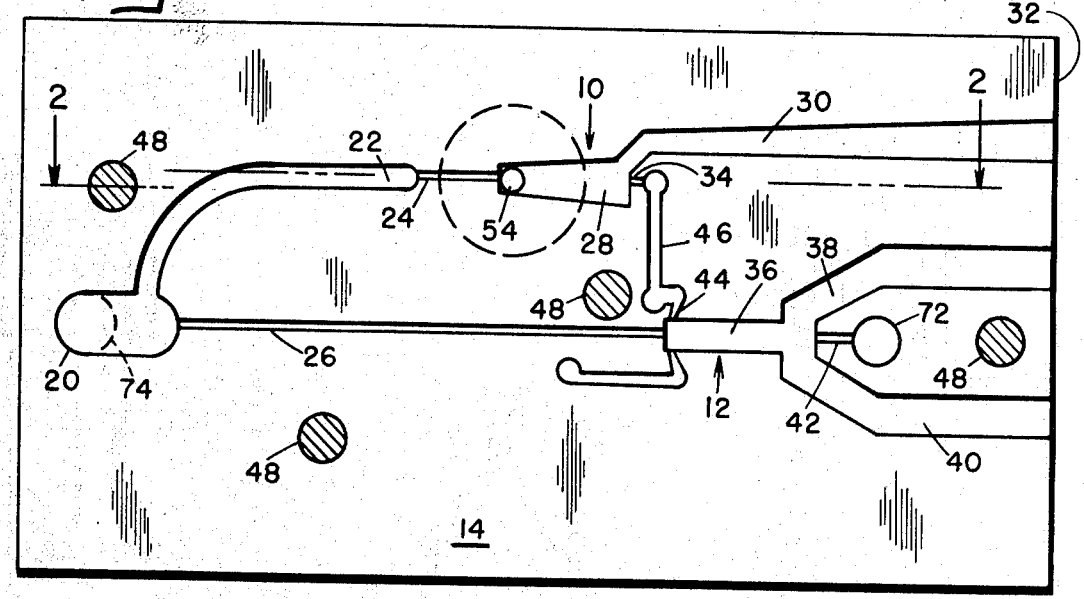
FIG. 1 is a detailed plan view of the grooved circuit board comprising a portion of the instant acoustically sensitive receiver.

Referring now to the drawings the instant receiver or control device essentially comprises a two-stage fluidic circuit that includes two fluid amplifiers 10 and 12. These two fluid amplifiers are formed by appropriately grooving the upper surface 14 of a main circuit board 16, this grooved surface then being covered by a suitable cover plate 18 in a manner well understood in the art. The specific fluid circuit defined by said grooved surface is illustrated in FIG. 1 and comprises a fluid supply inlet groove 20 that is formed in the board 16, which inlet groove communicates through a suitable groove 22 with the emitter groove or channel 24 of said fluid amplifier 10 and also communicates directly with the emitter groove or channel 26 of amplifier 12. Amplifier 10 includes a slightly diverging (as viewed in FIG. 1) groove 28 that defines an interaction chamber, the upstream end of which communicates with said emitter channel 24 while the downstream end thereof communicates with a slightly diverging venting channel 30 that extends longitudinally out through the end 32 of said circuit board 16. The downstream end of the interaction chamber also communicates with a collector groove or channel 34 that is coaxially aligned with said emitter groove 24. The amplifier 12 includes a widened groove 36 that defines an interaction chamber, the upstream end of which communicates with the emitter groove 26 while the downstream end thereof communicates with venting channels 38 and 40, the latter two channels also extending out through the said end 32 of circuit board 16. The downstream end of this interaction chamber also communicates with a collector groove or channel 42 that is coaxially aligned with said emitter groove 26. A control groove or channel 44 communicates at one end thereof with one side of the upstream end of said interaction chamber groove 36 while the other end thereof communicates with said collector groove 34 through a suitable channel 46.

Figure 2:
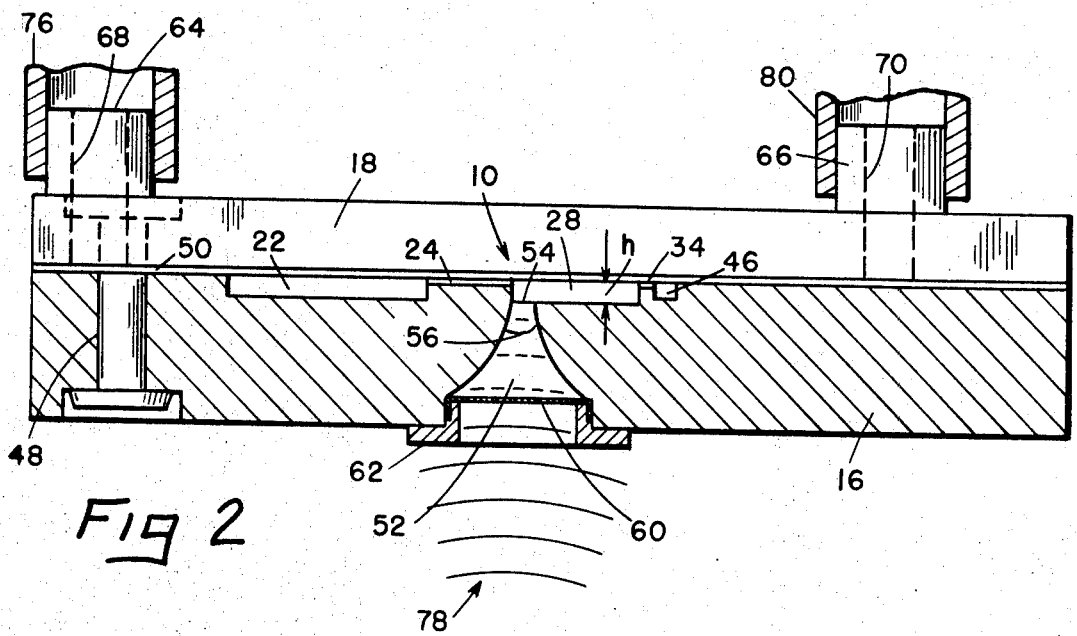
FIG. 2 is a side elevational view in partial section and shows the composite structure of the instant receiver which includes the apparatus shown in FIG. 1, the grooved circuit board being shown in section as taken along the section line 2–2 of FIG. 1.

As is illustrated in FIGS. 1 and 2 the depth $h$ as is best seen in FIG. 2, of the groove 22, said venting groove 30 and the interaction chamber groove 28 of amplifier 10 is considerably greater than that for the emitter groove 24 and collector groove 34 associated with this amplifier. In similar fashion the corresponding depth of groove 20, the interaction chamber groove 36 and venting channels 38, 40 of amplifier 12 is considerably greater than that for the emitter groove 26, control groove 44 and collector groove 42 associated with amplifier 12. The groove and channel configuration illustrated in FIG. 1 is approximately to scale, the typical lengths for the interaction chamber grooves 28 and 36 each being in the order of five-sixteenths of an inch. One circuit board model has been constructed wherein the cross-sectional size of the emitter groove 24 was made approximately .007 inches wide and .007 inches deep while the cross-sectional size of the emitter groove 26 was made approximately .015 inches wide and .015 inches deep. The cross-sectional sizes of collector grooves 34 and 42 were substantially the same as those for said emitter grooves 24 and 26 respectively. The above-noted dimensions represent only exemplary values and are not to be construed as being limiting values. When the cover plate 18 is sealingly secured to the circuit board 16, as by rivets 48 and gasket 50 or by other suitable means well known in the art, the various above-described grooves and channels will have substantially rectangular cross-sectional profiles.

Amplifier 10 is provided with a bell-shaped control passage 52 which is formed through the circuit board 16 and which terminates at its inner end at a port 54 disposed along the bottom of the upstream end of said interaction chamber groove 28 as is best seen in FIG. 2. The sidewalls 56 defining the control passage 52 arcuately diverge so as to form an externally facing exponentially contoured (as seen in FIG. 2) horn or sound wave receiving opening. Across the sonic wave conducting opening there is disposed a thin taut flexible plastic membrane 60 that is secured in place by any suitable means such as an annular collar 62. In the arrangement shown the collar 62 and membrane 60 are secured to the main circuit board 16 by being wedged into a suitable recess formed at the outer end of opening 52 as illustrated in FIG. 2. The effective plane of the membrane 60 is disposed substantially normal to the axis of said opening 52. In one embodiment .00025-inch thick mylar film was successfully used for the membrane material.

Integrally formed on the upper or outer side of said cover plate 18 is a pair of tubular fittings 64 and 66 that are provided with passages 68 and 70 which communicate, through suitable coextensive openings in the plate 18, with said fluid inlet groove 20 and the said collector groove 42 respectively. The said passage 70 communicates with a recess 72, FIG. 1, formed in said upper surface 14 of the circuit board 16, said recess 72 also communicating with said collector groove 42 of amplifier 12. The passage 68 communicates with fluid supply groove 20 as is diagrammatically indicated by the dotted line 74 of FIG. 1.

Each of the amplifiers 10 and 12 is monostable in operation. The normal mode of operation of each amplifier is such that a laminar jet of fluid exists between the emitter and collector thereof whereby the pressure in said collector will be relatively high. When a suitable signal is applied to the amplifier the fluid flow in the laminar jet will become turbulent and this turbulent fluid flow will for the most part exhaust through the associated amplifier vent grooves leaving the pressure in the collector relatively low. This turbulent mode of operation will continue until the said signal is removed whereupon the amplifier will immediately resume operating in said normal laminar mode.

The operation of the circuit board assembly of FIGS. 1 and 2 is as follows: assuming the fluid supply tubing or line 76, FIG. 2, is operatively coupled to the supply inlet passage 20 fluid, such as air, from a suitable pressure source not shown flows through both emitter channels 24 and 26 so that at the downstream end of each of said emitters there issues a laminar jet of fluid which is normally directed into the associated collector grooves 34 and 42 respectively. The resultant higher fluid pressure in the collector groove 34 of amplifier 10, however, produces a control signal or fluid flow which passes through the control groove 44 of amplifier 12 to thereby cause the latter to assume a turbulent mode of operation. Here then with no effective acoustical signal reaching the control port 42 of the small amplifier 10 the state of operation of the circuit is such that amplifier 10 remains in its laminar mode while amplifier 12 remains in its turbulent mode of operation. Under these conditions the pressure in the collector 42 of amplifier 12 will be relatively low and, with the collector 42 operatively connected through passages 72 and 70 to a receiver output tube or line 80, said low-pressure condition will also exist in said output line 80.

When an effective acoustical signal 78, FIG. 2, is introduced to the outer end of the control passage 52 said signal induces vibration in the thin membrane 60 which sets up corresponding vibrations in the fluid medium on the other side of said membrane. This action effectively allows the acoustical signal 78 to pass through the membrane 60 and through opening 52 so as to impinge on said laminar jet issuing from emitter groove 24 of the small amplifier 10. The laminar flow in amplifier 10 is thereby switched to a turbulent mode and the turbulent fluid flow exhausts through said venting channel 30. The resulting pressure drop in collector 34 and the control groove 44 will cause amplifier 12 to switch to its laminar mode whereby the pressure in collector 42 and said output line 80 will become relatively high. When said acoustical signal 78 is terminated the amplifiers 10 and 12 will immediately revert to their previously described laminar and turbulent modes respectively. It will thus be seen that the two-stage acoustically sensitive fluid amplifier circuit illustrated in the drawings still operates in substantially the same manner as previously when no membrane 60 was used, however now the unit has the very desirable added characteristic of being effectively isolated from all the foreign particles and other contaminants that might otherwise gain entry to the receiver or control device through the control port 52. This feature thus renders the instant control device suitable for use in most any environment where otherwise hostile conditions exist.

Since many changes could be made in the embodiment of the invention as particularly described and shown herein without departing from the scope of the invention, it is intended that this embodiment be considered as exemplary and that the invention not be limited except as warranted by the following claims.

I claim:
1. A two-stage sonically sensitive device comprising:
   a main grooved plate effectively defining;
      a first turbulence amplifier having an emitter, a collector, and a control line, said control line serving to permit the control of a laminar jet issuing from said emitter and towards said collector, and
      a second turbulence type amplifier having an emitter, a collector and a control line, said last mentioned collector being connected to said first mentioned control line;
   a cover plate sealingly secured to the grooved surface of said main plate; and
   a flexible plastic film less than .001 inches thick extending across said second mentioned control line.